Figure 1:
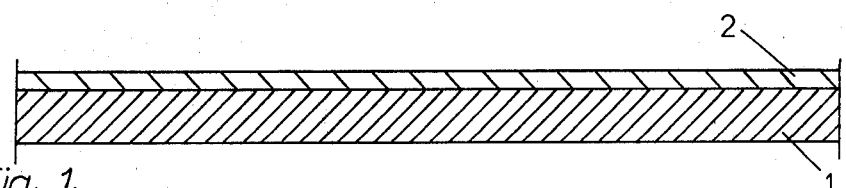

United States Patent [19]
Austin

[11] 3,931,429
[45] Jan. 6, 1976

[54] SURFACE COVERING MATERIALS
[75] Inventor: Michael Charles Austin, Tonbridge, England
[73] Assignee: Marley Tile A.G., Zug, Switzerland
[22] Filed: Feb. 25, 1974
[21] Appl. No.: 445,343

[30] Foreign Application Priority Data
July 6, 1973 United Kingdom............ 32411/73

[52] U.S. Cl. ............... 428/158; 427/270; 427/373; 428/159; 428/172; 428/315
[51] Int. Cl.² ...................... B32B 3/00; B32B 3/26
[58] Field of Search .......... 161/116, 119, 160, 159, 161/161, 123, 124, 89, 93; 117/10, 11, 12, 15, 38, 45, DIG. 9; 428/158, 159, 160, 172, 173, 201, 315, 202, 204; 427/264, 270, 373

[56] References Cited
UNITED STATES PATENTS
2,920,977 1/1960 Adams................................ 428/159
3,591,401 7/1971 Snyder et al........................ 428/201

Primary Examiner—William J. Van Balen
Attorney, Agent, or Firm—Bacon & Thomas

[57] ABSTRACT

This invention provides a process for the production of surface covering materials having a textured effect which comprises (a) applying a layer of a first foamable resinous composition on to a substrate; (b) applying a second foamable resinous composition on to selected areas of the surface of the said first foamable resinous composition; (c) applying at least one essentially non-foaming layer over the said first and second foamable resinous compositions; and (d) heating to effect foaming of the first and second foamable resinous compositions whereby a surface covering material having a textured effect is produced; the said first and second foamable resinous compositions being selected whereby upon heating substantial foaming of the said second foamable resinous compositions occurs before any substantial foaming of the said first foamable resinous composition. The invention further provides a surface covering material having a textured effect which comprises a substrate or backing layer, a layer of a first foamed resinous composition on the substrate or backing layer, a second foamed resinous composition on selected areas of the said first foamed resinous composition and a layer of an essentially non-foamed resinous composition over the said first and second foamed resinous compositions; the surface of the said material being at a higher level in areas with both first and second foamed resinous composition applied than in other areas of the surface covering material; and the said second foamed resinous composition having a structure characteristic of a resinous composition which has foamed to a significant extent whilst supported by a non-foaming substrate.

15 Claims, 10 Drawing Figures

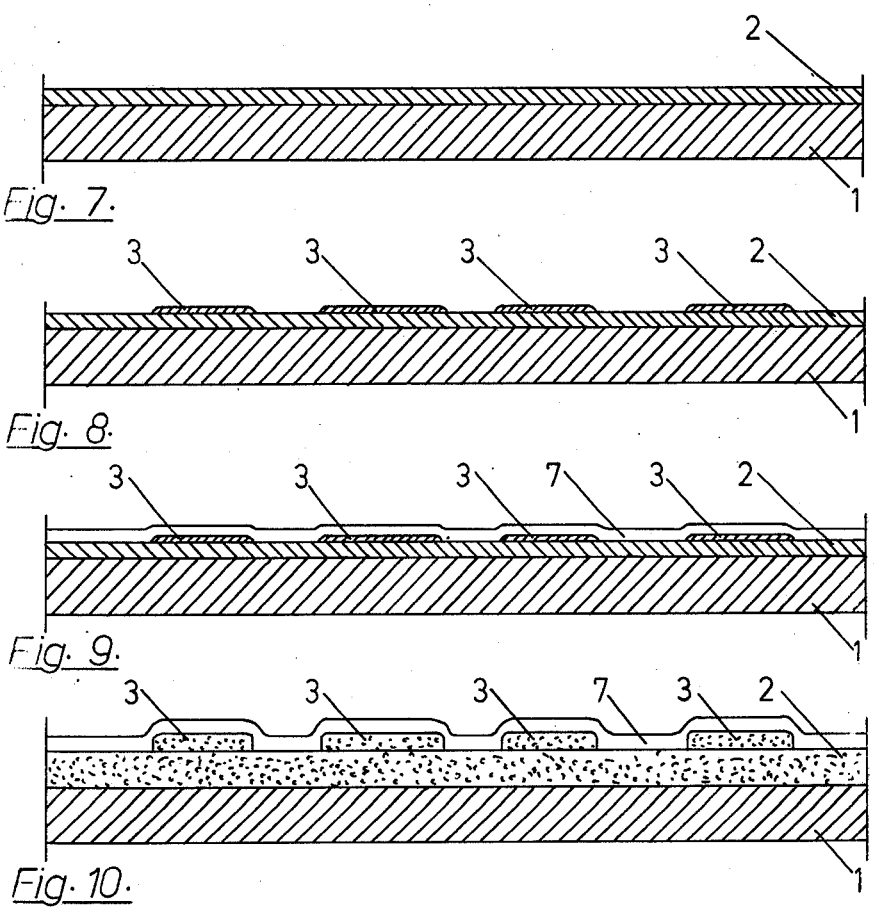

SURFACE COVERING MATERIALS

This invention relates to the production of surface covering material including for example floor covering materials, wall covering materials and covering materials for shelves, working tops and the like.

Polyvinyl chloride surface covering materials are well-known, the term "polyvinyl chloride" being used herein to include both vinyl chloride homopolymers and copolymers. Such surface covering materials can be produced in a variety of ways. For example, sheets of polyvinyl chloride material can be formed using calendering equipment and then laminated together to provide surface covering materials of a desired thickness. In another method, polyvinyl chloride plastisols are applied to a substrate such as asbestos paper or woven hessian fabric followed by gelation of the plastisol and if desired subsequent application of further polyvinyl chloride layers as necessary to provide surface covering materials of adequate thickness. If a film casting substrate is used as substrate as described in British Patent No. 1,049,651 the substrate can be removed after gelation of the plastisol to provide a flooring material which does not incorporate a substrate. Alternatively layers of polyvinyl chloride material can be applied either side of the substrate, for example as described in British Patent No. 1,029,085. Also it is possible to manufacture a multilayer polyvinyl chloride flooring material with one or more layers produced by calendering and another layer or other layers produced from polyvinyl chloride plastisol for example as described in British Patent No. 1,206,584.

It is frequently desirable to provide polyvinyl chloride surface covering materials with a printed pattern for decorative purposes. The usual method of doing this involves printing the pattern on to the surface of the material using appropriate printing inks, e.g. by gravure printing. Having applied a printed pattern, it is usual to cover this with a transparent polyvinyl chloride wear layer; otherwise in use the pattern may quickly be removed by wear. Polyvinyl chloride wear layers can be applied for example either as pre-formed calendered sheets or using polyvinyl chloride plastisols.

For some purposes particularly in the case of floor covering materials, it is desirable to incorporate foamed polyvinyl chloride material into the surface covering in order to provide a product with increased thickness which has resilience and good tread characteristics. It is thus known to produce floor covering materials including a foamed layer by incorporating heat-activatable blowing agents in layers of polyvinyl chloride material produced by calendering or by gelation of polyvinyl chloride plastisols and to effect foaming by decomposition of the blowing agent.

Where a foamed layer is included in surface covering materials, it has been found that materials of attractive appearance can be obtained by producing textured effects in the foam. Various methods of producing surface covering materials including resinous foam and having a textured effect have thus been proposed. One method comprises applying foamable resinous composition on to selected areas of a substrate, applying at least one overall layer of an essentially non-foaming resinous composition over the substrate and the foamable resinous composition(s) thereon, and heating to effect foaming of the foamable resinous composition(s) whereby a surface covering material having a textured effect is produced.

The substrate used in this method is conveniently a non-woven or woven fabric or a pre-formed film. It is advantageous to select a substrate having good dimensional stability at the elevated temperatures encountered in subsequent steps of the method and asbestos paper, a material in which asbestos fibres are bonded with synthetic rubber, is one substrate which can conveniently be used; others include woven glass fibre fabrics and glass fibres bonded for example with synthetic resins.

It is often advantageous to produce surface covering materials which include an overall foamed layer in addition to the resinous foam resulting from application of the foamable resinous composition on to selected areas of the substrate. Thus for example it may be desired first to apply an overall layer of foamable resinous composition on to the substrate and then to effect a second application of foamable resinous composition on to selected areas of the surface of the overall foamable layer. Upon subsequent foaming, the overall foamable layer expands to provide increased thickness and resilience in the final product whilst the foamable resinous composition on selected areas of the substrate expands to provide a textured surface effect in the product. It has however been found that the method utilising an overall foamable layer operates less well than expected. In particular, the textured effect obtained when the foamable resinous composition on selected areas of the overall foamable layer expands together with the overall foamable layer is much less pronounced than when the said foamable resinous composition is in direct contact with the substrate or an essentially non-foaming layer during foaming, and in consequence the textured effects obtained are generally of less attractive appearance. Furthermore, where substrates such as rubber-bonded asbestos paper which commonly have surface irregularities are used and the overall foamable layer is in direct contact with the surface of the substrate, such irregularities are also present and are indeed magnified in the surface of the foamed resinous composition providing the high points in the textured product obtained.

It is an object of the present invention to provide a new process for the production of surface covering materials in which an overall foamed layer is in direct contact with a foamed resinous composition present only in selected areas thereby providing a textured effect.

According to one feature of the present invention there is provided a process for the production of surface covering materials having a textured effect which comprises (a) applying a layer of a first foamable resinous composition on to a substrate; (b) applying a second foamable resinous composition on to selected areas of the surface of the said first foamable resinous composition; (c) applying at least one essentially non-foaming layer over the said first and second foamable resinous compositions; and (d) heating to effect foaming of the first and second foamable resinous compositions whereby a surface covering material having a textured effect is produced; the said first and second foamable resinous compositions being selected whereby upon heating substantial foaming of the said second foamable resinous composition occurs before any substantial foaming of the said first foamable resinous composition.

According to a further feature of the present invention, there is provided a surface covering material having a textured effect which comprises a substrate or backing layer, a layer of a first foamed resinous composition on the substrate or backing layer, a second foamed resinous composition on selected areas of the said first foamed resinous composition and a layer of an essentially non-foamed resinous composition over the said first and second foamed resinous compositions; the surface of the said material being at a higher level in areas with both first and second foamed resinous composition applied than in other areas of the surface covering material; and the said second foamed resinous composition having a structure characteristic of a resinous composition which has foamed to a significant extent whilst supported by a non-foaming substrate.

It is important in carrying out the process according to the invention that upon heating the second foamable resinous composition should foam to a significant extent before significant foaming of the first foamable resinous composition. Foaming of the second foamable resinous composition to produce the textured effect involves stretching the essentially non-foaming layer applied thereover. Without wishing to be limited by any theoretical explanation of the operation of the process according to the invention it is believed that the second foamable resinous composition needs a solid support in order to exert sufficient force to stretch the non-foaming layer and to produce the textured effect. If there is no differential foaming and the first and second foamable resinous composition foam together, then there is no solid support for the second foamable resinous composition and the tendency is for the two foamable resinous compositions to mix without significant stretching of the non-foaming layer and therefore without the production of the desired degree of texturing. Also, it is in general possible when applying the first foamable resinous composition to ensure that the surface thereof is essentially flat and free from imperfections and irregularities, and foaming of the second foamable resinous composition against such a surface before significant foaming of the first foamable resinous composition results in the surface of the foamed composition providing high points in the textured surface of the product itself being generally flat and free from imperfections and irregularities. Thus the structure of the second foamed resinous composition is characterised by the absence both of such undersired imperfections and irregularities in its surface and of such substantial mixing of the first and second foamed resinous compositions as can in general be observed when the second foamed resinous composition has commenced to foam after or simultaneously with the commencement of foaming of the first foamed resinous composition.

The essentially non-foaming layer applied in step (c) of the process according to the invention can for example be a transparent wear layer. Alternatively, the essentially non-foaming layer can be an opaque pigmented layer which is to provide background colour in the final product. In the latter case, it will in general be convenient to print a decorative pattern as desired on the surface of the essentially non-foaming layer and then to apply an additional transparent wear layer which in use will serve as a protection against wearing of the printed decorative pattern.

As stated above, suitable substrates include non-woven and woven fabrics and pre-formed films. As with previous processes, it is advantageous to select a substrate having good dimensional stability at the elevated temperatures encountered in subsequent steps of the method and asbestos paper is one substrate which can conveniently be used. Other suitable substrates include woven glass fibre fabrics and glass fibres bonded with synthetic resins. If desired, the substrate used may be impregnated with a resinous composition and/or may have one or more layers of resinous composition bonded either to the side on to which the foamable resinous composition is applied or on to the reverse side thereof. Thus for example it may be convenient to apply a levelling coat of a resinous composition prior to application of the first foamable resinous composition and/or to apply a layer of resinous composition (foamable or non-foamable) on to the reverse side of the substrate to increase still further the thickness of the product to be obtained. It will be appreciated that any such layers applied are to be regarded as forming part of the substrate in the carrying out of the process according to the invention.

If desired, a film casting support (i.e. a support which is capable of supporting the foamable resinous composition in contact therewith and adhering thereto to enable the coating and subsequent heating operations to take place, the adhesion being such that the support can be readily removed from the product obtained after heating) may be used as substrate or a part thereof. Where a film casting support is used, it is preferably made of a paper, such as Kraft paper, treated to give the paper the required adhesive and release properties. Although the film casting support should have little adhesion to the resinous composition applied thereto it should exhibit sufficient adhesion to the resinous compositions whereby it is held in contact therewith during the coating and heating processes. However, the adhesion of the film casting support should not be so strong as to prevent removal of the support from the product obtained after heating and for convenience the support should be capable of being removed cleanly and easily from the foamed product. Film casting paper can be given the required adhesive properties by coating the paper with, for example, silicone resin and polyvinyl compounds such as polyvinyl alcohol. Silicone resin coated paper is preferred and, by varying the quantity of silicone used in the coating, paper of the desired adhesive properties may be prepared. Suitable film casting papers are commerically available, one such paper being that sold under reference M4/17 by the Wiggins Teape Group. When using a film casting support as substrate, an overall layer of resinous composition, e.g. a polyvinyl chloride plastisol, may if desired, first be applied to the film casting support, this layer of resinous composition subsequently serving as a backing layer for the product following removal of the film casting support.

The first foamable resinous composition applied on to the substrate in accordance with the present invention is preferably a polyvinyl chloride plastisol which contains a blowing agent and which has appropriate viscosity characteristics for the application method to be used. With polyvinyl chloride plastisols, the plastisol will contain the polyvinyl chloride resin (selected according to the desired viscosity of the plastisol) plasticiser and stabiliser together with blowing agent and optional ingredients such as for example fillers, viscosity modifiers, volatile additives and pigments.

The polyvinyl chloride included in the plastisol may be a homopolymer or copolymer, copolymers when used preferably containing a major proportion of units derived from vinyl chloride. Other copolymerised monomers which can be incorporated in the copolymers as desired include for example vinyl acetate and vinylidene chloride. One polyvinyl chloride polymer which can with advantage be used is that known by the trade name "Vixir 3102".

The plasticisers used are conveniently phthalate plasticisers, for example nonyl, octyl, butyl, butylbenzyl and dialphanyl phthalates. Phosphates (e.g. trixylenyl and tricresyl phosphates), adipates and subacates may also for example be used as plasticisers.

It is in general necessary to incorporate into the plastisol a quantity of a stabiliser, that is a substance capable of retarding decomposition of the resin during compounding and subsequent exposure to light. Preferably the stabiliser selected is one which also possesses the property of causing the blowing agent to decompose over a narrower temperature range, hereinafter referrred to as a "stabiliser-kicker". Dibasic lead phthalate is a suitable stabiliser-kicker, and other substances which may be used include certain other lead-containing compounds, certain organo-tin compounds and certain metal soaps, particularly stearates of metals such as zinc, cadmium barium and aluminium.

The blowing agent incorporated into the plastisol is in general conveniently an organic substance which liberates nitrogen upon heating. Substances which are conveniently used as blowing agents are those which decompose over a relatively narrow temperature range. A particularly suitable blowing agent for use in the process according to the invention is azodicarbonamide.

Fillers may be incorporated into the plastisols as optional ingredients. Various inert inorganic substances may be used as filler, the most convenient being calcium carbonate e.g. in the form of whiting, precipitated chalk, ground limestone or ground dolomite.

Viscosity modifiers may also be incorporated as required to influence the viscosity characteristics of the plastisol, hexylene glycol being an example of a viscosity modifier which can conveniently be used.

Volatile additives may also be included in the plastisols, examples of such additives being solvents such as for example white spirit and low boiling esters.

Pigments may be included as desired, and it may for example be desirable to pigment the first foamable resinous composition particularly when the essentially non-foaming layer applied in step (c) is a transparent wear layer and the first foamable resinous composition after foaming is in consequence visible in the final product. When a white background is desired for the final product, the pigment is conveniently provided by titanium white. When coloured backgrounds are required, inorganic pigments (e.g. iron oxide pigments and cadmium reds) and organic pigments (e.g. benzidene yellows and phthalocyanine blues and greens) may conveniently be employed.

As stated above, the proportions of the various ingredients used must be selected to provide a plastisol having suitable viscosity characterisitics for the application method to be used. The plastisol is preferably applied by an overall spreading technique, e.g. using a doctor blade or air-knife. In general, preferred plastisols for application by these methods will contain, for every 100 parts by weight of polymer present, from 30 to 100 parts by weight of plasticiser; up to 10 parts (e.g. up to 5 parts) by weight of stabiliser; up to 10 parts (e.g. up to 5 parts) by weight of blowing agent; up to 100 parts, advantageously up to 20 parts, by weight of filler; up to 10 parts by weight of viscosity modifier; and up to 20 parts by weight of volatile additives.

The thickness of the layer of first foamable resinous composition applied can vary within wide limits and will depend upon the desired thickness for the final product. The purpose of incorporating the first foamable resinous composition is however to increase the thickness and resilience of the final product, and when the product is to be a floor covering material it will in general be preferable for the thickness to be at least 0.005 inches prior to foaming.

After each application of a plastisol composition, it is in general convenient to dry the composition sufficiently to avoid undersired damage upon subsequent application of further coatings. Drying is conveniently effected by surface infrared heating or hot air heating, for example at a temperature of about 140°C. It will be appreciated that the temperature and length of time used for drying is not critical provided that the coatings of resinous composition are given adequate strength for subsequent processing and also of course provided that the temperature reached during drying is not sufficient to activate the blowing agent contained in the foamable resinous composition. After heating, cooling is effected e.g. by contact with water-cooled rollers prior to the next step in the process. It is generally advantageous to dry the resinous composition to a matt finish, further drying whereby a glossy surface finish is obtained being preferably avoided.

The next step in the process according to the invention is the application of a second foamable resinous composition on to selected areas of the surface of the said first foamable composition. This application of the second foamable resinous composition is advantageously effected by the technique of rotary screen printing. In this method of printing, the foamable resinous composition is forced through a rotary metal cylindrical screen on to the material to be printed. The pattern is formed either by blanking off areas of the screen e.g. using a cross-linkable lacquer, or alternatively by producing a screen which instead of an overall mesh has a mesh which itself is in the form of the desired pattern with other areas of the screen being without mesh holes. The printing is conveniently effected using screens having a mesh size of from 17 to 100 British Standard Mesh, the use of a 40 British Standard Mesh having been found to be especially convenient. The thickness of the coatings of plastisol which are desirably applied depend upon the desired thickness and degree of texture in the final product. The thickness of plastisol which can conveniently be applied on to a substrate by the technique of rotary screen printing varies with the physical properties of the plastisol. In general it has been found that the thickness of foamable resin composition applied in one rotary screen printing step is conveniently not greater than 0.006 inches and is preferably not greater than about 0.004 inches. Thus the thicknesses of foamable resin composition applied are with advantage within the range of from 0.002 to 0.004 inches. If greater thickness over the selected areas or parts thereof are desired, then these can readily be applied by using two or more rotary screen printing steps in series whereby two or more superimposed applications of the foamable resinous composition are effected. The second and subsequent applications may if desired make use of foamable resinous compositions containing different amounts of blowing agents to achieve multi-level texturing of subsequent expansion. Also, the second and subsequent applications can if desired only partly overlap the first application, again providing multi-level texturing on subsequent expansion.

As with the first foamable resinous composition, the second foamable resinous composition is preferably a polyvinyl chloride plastisol containing polyvinyl chloride resin, plasticiser and stabiliser together with blowing agent and optional ingredients such as fillers, viscosity modifiers, volatile additives an pigments. Examples of suitable ingredients and preferred proportions for the ingredients are generally as described above in connection with the first foamable resinous composition. Again, when the essentially non-foaming layer applied in step (c) is a transparent wear layer, it may be desirable to pigment the compositions and thus by using first and second foamable resinous compositions which are differently pigmented it is possible to provide a pattern in register with the textured effect in the final product. If desired, differently pigmented second foamable compositions may be applied to different selected areas of the first foamable composition.

It is important in carrying out the process according to the invention that, upon heating, the second foamable resinous composition should foam to a significant extent before significant foaming of the first foamable resinous composition.

The foaming characteristics of the first and second foamable compositions are influenced by the constituents of the compositions and their relative properties. The desired difference in foaming between the two compositions may thus, for example, be achieved by the following methods, it being in general convenient to use one of the methods listed or a combination of two or more thereof:

1. by appropriate selection of blowing agents. If different blowing agents are used in the two compositions and (when incorporated in their respective compositions) the blowing agents decompose within different temperature ranges, then by incorporating the blowing agent decomposing within a lower temperature range in the second foamable resinous composition it is possible to ensure that the second foamable resinous composition will foam to a significant extent before significant foaming of the first foamable resinous composition.

2. by use of the same blowing agent in different quantities and/or in a different physical form. Thus for example a composition containing a larger quantity of azodicarbonamide as blowing agent will in general foam more quickly than a similar composition containing a smaller quantity of azodicarbonamide. Likewise a composition containing azodicarbonamide in fine particle size form will in general foam more quickly than a similar composition containing azodicarbonamide of coarser particle size. Thus, by use of the same blowing agent in different quantities and/or in a different physical form in the two compositions, it is possible to arrange for the second foamable resinous composition to foam to a significant extent (due to a more rapid rate of foaming) before significant foaming of the first foamable resinous composition (due to a less rapid rate of foaming).

3. by use of different stabiliser-kickers. The particular stabiliser-kicker selected for use with any blowing agent affects both the temperature at which foaming commences and also the temperature range over which foaming occurs. Thus by using different stabiliser-kickers in otherwise identical compositions it is possible to arrange for the second foamable resinous composition to foam to a significant extent before significant foaming of the first foamable resinous composition. It has for example been found convenient to use dibasic lead phthalate as stabiliser-kicker in the first foamable resinous composition and "MARK SIT" (a stabiliser-kicker of Lankro Chemicals Limited) in the second foamable resinous composition.

4. by use of different polymers. The chemical structure of the polymer (e.g. homopolymer or copolymer), the molecular weight of the polymer, the method of manufacture (e.g. emulsion or suspension polymerisation) and the particle size and shape of the polymer are all factors which can affect the foaming characteristics of the compositions. By simple testing it is possible to determine in the case of two polymers to be compared which polymer will be appropriate for use in the first foamable resinous composition and which polymer will be appropriate for use in the second foamable resinous composition.

In general, it has been found advantageous to utilise a combination of the above methods of achieving the desired differences in foaming characteristics in formulating the compositions. Moreover, it must be appreciated that other methods can if desired be utilised, e.g. the incorporation of any substance or substances in the first and/or second foamable resinous compositions serving to provide foaming characteristics whereby in use substantial foaming of the said second foamable resinous composition occurs before any substantial foaming of the said first foamable resinous composition. The success of the process according to the present invention does not depend upon the method of achieving the different foaming characteristics provided that it is effective in causing significant foaming of the second foamable resinous composition before significant foaming of the first foamable resinous composition.

After drying and cooling, it is possible if desired to print on to the surface of the second foamable resinous composition before application of at least one essentially non-foaming layer in accordance with step (c) of the process according to the invention. This may for example be desired when a transparent non-foaming layer is to be used.

At least one overall layer is conveniently applied in step (c) of the process. Whilst this can if desired be applied as a pre-formed film e.g. by calendering, it is in general preferred to form the layer by application of a polyvinyl chloride plastisol composition which is essentially non-foaming in character. The layer is conveniently applied by an overall spreading technique, e.g. using a doctor blade or air-knife or rotary screen printing equipment with an all over mesh screen, or by reverse roll or curtain coating.

The polyvinyl chloride plastisol composition used in the production of the overall layer(s) is conveniently in the form of a spreadable paste. Suitable compositions are well-known and in general contain polymer (e.g. of the types described above with reference to the foamable compositions), plasticiser (also as described above) and optional ingredients such as fillers, viscosity modifiers and volatile additives (again as described above). The plastisols also conveniently contain stabilisers such as mixed barium, cadmium and/or zinc salts of fatty acids such as for example stearic, lauric and ricinoleic acids. Other known stabilisers include certain organo-tin compounds e.g. dibutyl tin dilaurate and lead-containing compounds such as dibasic lead carbonate and lead stearate. Auxiliary stabilisers such as epoxidised soya bean oil may also be incorporated as desired. The proportions of the various plastisol ingredients are preferably within the limits specified above in connection with the foamable plastisol except that the amount of filler can if desired be increased above the limit of 100 parts per 100 parts of polyvinyl chloride.

The overall layer(s) of resinous composition can if desired be transparent or translucent (e.g. tinted), in which case pigmented first and second foamable resinous compositions can serve to provide decoration visible through the overall layer(s) in the final product. An overall layer can thus for example provide a wear layer in the final product. Alternatively an opaque overall layer or layers the upper surface of which is visible as background colour in the final product can be used. In the latter case, pigments can be incorporated into the resinous composition used for the overall layer(s), or when more than one overall layer is applied, used at least for the uppermost overall layer.

The thickness of the overall layer(s) applied can vary within wide limits and will depend upon the purpose to be served thereby (e.g. as intermediate or wear layer) and the desired thickness and texture for the final product. If desired, particularly where an intermediate layer is concerned, the thickness can be the minimum which can be applied without difficulty by the application method used to obtain a coherent layer. It has been found that the thickness of the overall layer is preferably at least 0.0005 inches and when applied by rotary screen printing can for example conveniently be about 0.002 inches measured at points where the second foamable resinous composition is applied. It will be appreciated that the thickness of the overall layer at points where the second foamable resinous composition has not been applied will be greater particularly where the overall layer is applied by spreading. In general, the valleys between adjacent areas of second foamable resinous composition will still be detectable after application of an overall layer of this thickness but will be significantly shallower in depth than before application of the overall layer. A flat intermediate layer serves to facilitate the printing of a decorative pattern. Where the overall layer is to provide a wear layer for a flooring material for domestic use, a thicker layer (e.g. 0.004 to 0.015 inches measured at points when the second foamable resinous layer is applied) may be used and an essentially flat upper surface may then be obtainable prior to heating. Such layers are conveniently applied using a doctor blade or air-knife. It will be appreciated, however, that subsequent to step (d) such wear layers will no longer be flat due to foaming of the first and second resinous compositions.

Where the overall layer or layers are provided using plastisols as described above and further compositions are to be applied on to the surface thereof, drying is again conveniently effected as described above after application of the overall layer (or each layer in the event that two or more overall layers are utilised).

Where one or more opaque overall layers are applied the next step in the process according to the invention is preferably the application by printing of a decorative pattern on to the surface of the overall layer(s). Rotary screen printing or gravure printing is advantageously used for this step although other printing methods such as for example block printing can if desired be used. One particular advantage of rotary screen printing is that it is possible using this technique to print in the valleys (corresponding to areas in which no second foamable resinous composition has been applied) which as explained above may be present on the overall layer surface. Where relatively deep valleys are present and an ink which is not fully opaque is used additional decorative effects may be obtained by printing the ink both in and out of register with the valleys. A more intense coloration will be obtained in the valleys due to the greater thickness of printing ink applied therein. Also the speed of rotary screen printing is compatible with the speed of the other process steps thus facilitating the carrying out of the process on a straight-through production line. Where rotary screen printing is used, the printing compositions are preferably polyvinyl chloride plastisols of the kind hereinbefore described with reference to the application of the foamable resinous layers, without a blowing agent incorporated, although other printing compositions such as for example pigmented water-based acrylic resin emulsions can if desired by used. The plastisols can contain pigments as desired, suitable types of pigment being as hereinbefore described. The decorative pattern applied can if desired be in register with the textured effect to be provided by subsequent foaming of the second foamable resinous compositions. Where differently coloured plastisols are to be applied to different portions of the overall layer surface, a plurality of rotary screen printing steps can be carried out in series with drying and cooling preferably to a matt finish between each step. In general the thickness of the coatings of printing composition applied can be varied within wide limits. Where it is desired to apply as thin coatings as possible, coatings of high opacity having a thickness of about 0.001 inches can be used although even thinner coatings down to for example about 0.0002 inches may be sufficient particularly where multitone effects are desired. If thicker coatings are applied, relief effects can be obtained in the final product. The rotary screen printing is conveniently carried out using from 40 to 120 British Standard Mesh screens, a 60 British Standard Mesh screen being particularly convenient in this regard. The decorative prints and the overall layer(s) to which they have been applied may have adequate wear characteristics without the protection of an overall transparent wear layer. In general, however, an overall transparent wear layer is preferably subsequently applied in this embodiment of the invention. As with the previous overall layer(s), this is conveniently provided by a polyvinly chloride composition. Although a pre-formed calendered film can be used, it is preferred to apply the wear layer as a polyvinyl chloride plastisol, suitable formulations for providing a transparent wear layer being well-known. The thickness of the wear layer depends upon the wear characteristics required. In the case of flooring materials for domestic use, wear layers having a thickness of from 0.004 to 0.015 inches are conveniently used.

Once application of the various compositions making up the surface covering material is complete, heating is effected to gel the plastisols present in the assembly and to decompose the blowing agent(s) present in the foamable resin compositions. With polyvinyl chloride plastisols and the blowing agents commonly used therewith, temperatures within the range of from 165° to 200°C are in general preferably used. The ingredients of the foamable resin compositions and the heating step are advantageously controlled to give approximately 2- to 5- fold expansion of both the first and second foamable resinous compositions on foaming. Heating at about 180° to 190°C for about 100 seconds has given satisfactory results in processes according to the invention carried out under test conditions.

During heating to effect foaming, significant foaming of the second foamable resinous composition will take place, prior to significant foaming of the first foamable resinous composition. Heating can conveniently be carried out by passing the assembly through a hot air oven and upon entry into the oven the temperature of the assembly will gradually rise until it reaches the air temperature within the oven. Once a temperature is reached at which significant foaming of the first foamable resinous composition commences, then both first and second foamable resinous compositions will continue to foam together until the assembly emerges from the oven and heating is discontinued. It is in general advantageous if in the final product the degree of expansion of the first foamable resinous composition in approximately the same as the degree of expansion of the second foamable resinous composition and this can in practice by achieved if the compositions are so formulated that the rate of expansion of the first foamable resinous composition once significant foaming commences is greater than the continuing rate of expansion of the second foamable resinous composition. It is thus possible for both compositions to have expanded to approximately the same extent in the final product despite the fact that significant foaming of the second foamable resinous composition occured before significant foaming of the first foamable resinous composition. It is generally desirable that heating of the assembly should cease before complete foaming (i.e. before complete decomposition of blowing agent) of either composition has occurred; otherwise there is a danger that collapse of the foam will occur.

Where a film casting support is employed, this can be removed following the heating step and a permanent backing layer can then be applied. Thus for example a polyvinyl chloride backing layer can be applied either by adhesion of a preformed calendered film. Alternatively, as discussed previously, a resinous composition may be applied to the film casting support prior to step (a) and following removal of the film casting support this resinous composition will serve as the permanent backing layer.

The process according to the invention has been described above particularly with reference to surface covering materials produced using polyvinyl chloride resinous compositions. It will be appreciated however that other resinous compositions can if desired be used. Thus for example acrylic based compositions can be used to provide coatings forming part of the substrate and polyurethane-based compositions can be used to provide flexible wear layers.

The accompanying drawings illustrate schematically two processes according to the invention, showing cross-sections of surface covering materials at various stages of manufacture in accordance with the present invention.

Figure 2:
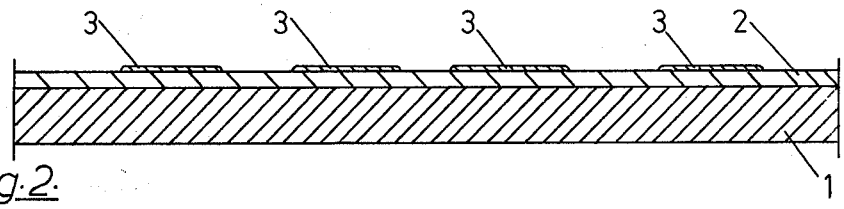
Figure 3:
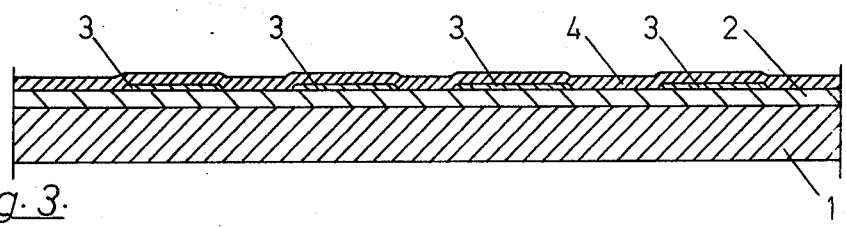
Figure 4:
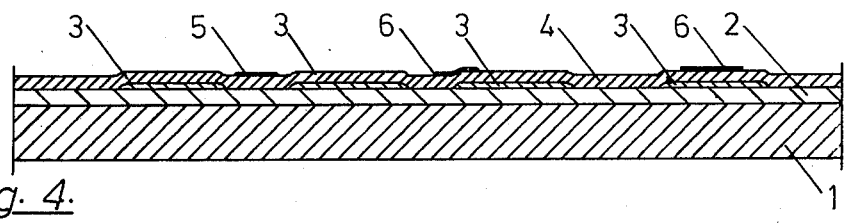
Figure 5:
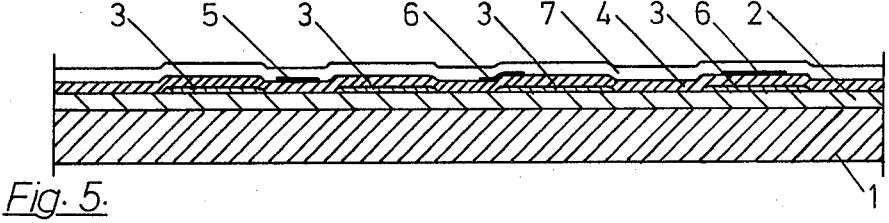
Figure 6:
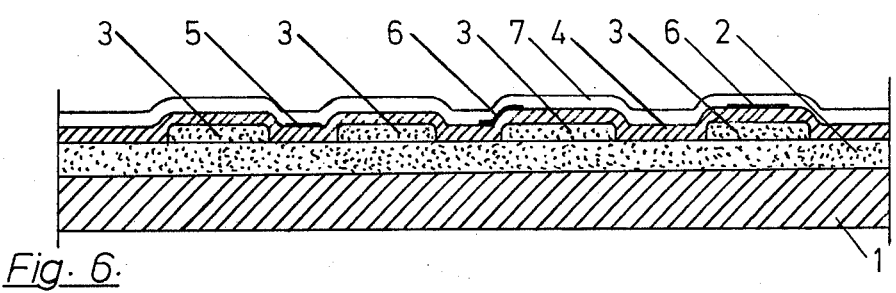

Referring first to FIGS. 1 to 6, FIG. 1 shows a substrate 1 which has been provided with an overall coating of a first foamable resinous composition 2. In FIG. 2, a second foamable resinous composition 3 selected to provide differential foaming as hereinbefore described has been applied on to selected areas of the surface of the first foamable resinous composition 2. In FIG. 3, the overall layer 4 has been applied over the substrate and the foamable resinous compositions thereon. In FIG. 4, coatings 5 of printing composition have been applied in register with valleys between the second foamable resinous composition 3 and further coatings 6 of printing composition have been applied on to the overall layer 4 but not in register. In FIG. 5 an overall transparent wear layer 7 has been applied. In FIG. 6 the assembly has been heated to effect gelation and foaming of the foamable resinous compositions 2 and 3 to provide the final product.

Referring to FIGS. 7 to 10, FIG. 7 shows a substrate 1 which has been provided with an overall coating of a first pigmented foamable resinous composition 2. In FIG. 8 a second differently pigmented foamable resinous composition 3 selected to provide differential foaming as hereinbefore described has been applied on to selected areas of the surface of the first foamable resinous composition 2. In FIG. 9 an overall transparent wear layer 7 has been applied. In FIG. 10, the assembly has been heated to effect gelation and foaming of the foamable resinous compositions 2 and 3 to produce a final product in which the differently pigmented compositions 2 and 3 provide a pattern in register with the textured effect.

Apart from the steps hereinbefore described as providing the process according to the invention, it will be appreciated that additional process steps can be effected as desired. Thus for example a resinous layer can be provided on the side of the substrate remote from the foamable resin compositions, such layer being foamable of non-foamable as desired.

The process according to the invention is particularly useful for the preparation of flooring materials. Thus flooring materials can be prepared which have excellent wear properties, a transparent wear layer serving to protect the layers beneath, and attractive appearance due to the combination of textured effect and decorative printing, and desirable thickness, resilience and tread characteristics due to the presence of the foam layer provided by the first foamable resinous composition.

Although the process is applied with particular advantage to the production of floor covering materials, it can be used for the production of other surface coverings, particularly wall and ceiling surface coverings.

The following Example illustrates the invention:

Example

A first foamable resinous composition is prepared having the following formulation:

| | Parts by weight |
|---|---|
| Breon P 130/1 | 100.0 |
| Bisoflex DAP (B.P. Chemicals) | 63.0 |
| Hexylene glycol | 3.0 |
| Red 2130 (pigment) | 1.0 |
| Foam Masterbatch | 13.0 |

The Foam Masterbatch used in the formulation of the above composition was previously prepared from the following:

| | Parts by weight |
|---|---|
| Genitron AC 2 (Fisons) | 1.25 |
| Dythal | 2.00 |
| Rutiox HD (white pigment) | 4.00 |
| Butyl Benzyl Phthalate | 4.00 |

The first foamable resinous composition which is in the form of a spreadable paste, is applied by doctor knife as an overall coating of 0.010 inches on to an asbestos paper substrate (0.032 inches). The coated substrate is dried to a matt finish by infra red heating at 140°C. followed by cooling by contact with a water-cooled roll.

A second foamable resinous composition is prepared having the following formulation:

| | Parts by weight |
|---|---|
| Vixir 3102 (Societa Italiana Resine, Milan) | 100.0 |
| Bisoflex DAP | 65.0 |
| Hexylene glycol | 3.0 |
| Mark SIT | 2.1 |
| Rutiox HD | 4.0 |
| Foam Masterbatch | 5.8 |

The Foam Masterbatch used in the formulation was previously prepared from the following:

| | Parts by weight |
|---|---|
| Genitron AC 4 (Fisons) | 2.5 |
| Bisoflex DAP | 3.5 |
| Rutiox HD | 4.0 |

The second foamable resinous composition is printed on to selected areas of the surface of the overall first foamable resinous composition to a thickness of 0.004 inches using a rotary screen printer provided with a 40 BS Mesh screen. Drying is again effected by infra red heating, care being taken to ensure that the temperature of the second foamable resinous composition is kept below that at which foaming would commence, followed by cooling by contact with a water-cooled roll.

A third composition serving to provide a transparent wear layer is prepared having the following formulation:

| | Parts by weight |
|---|---|
| Polyvinyl chloride (dispersion grade) | 100.0 |
| Dinonyl phthalate | 15.0 |
| Butyl benzyl phthalate | 25.0 |
| Hexylene glycol | 3.0 |
| Barium cadmium liquid soap stabilizer | 2.5 |
| Epoxised soya bean oil | 3.0 |
| White spirit | 3.0 |

The said third composition, which is in the form of a spreadable paste, is applied by doctor knife as an overall coating having a thickness above the surface of the second foamable resinous composition of 0.008 inches.

The assembly is heated in a hot-air oven for 100 seconds whereby a temperature of about 185°C. is reached with consequent gelation of the plastisols and foaming of the foamable compositions. The assembly is finally cooled and rolled to provide the finished product.

I claim:

1. A process for the production of surface covering materials having a textured effect which comprises (a) applying a layer of a first foamable resinous composition on to a substrate; (b) applying a second foamable resinous composition on to selected areas of the surface of the said first foamable resinous composition; (c) applying at least one essentially non-foaming resinous layer over the said first and second foamable resinous compositions; and (d) heating to effect foaming of the first and second foamable resinous compositions whereby a surface covering material having a textured effect is produced; the said first and second foamable resinous compositions being selected whereby upon heating substantial foaming of the said second foamable resinous composition occurs before any substantial foaming of the said first foamable resinous composition.

2. A process as claimed in claim 1 wherein the substrate comprises rubber-bonded asbestos paper.

3. A process as claimed in claim 1 wherein the substrate comprises a film casting support, the film casting support being removed subsequent to step (d).

4. A process as claimed in claim 3 wherein subsequent to removal of the film casting support a polyvinyl chloride composition backing material is applied to the product.

5. A process as claimed in claim 1 wherein subsequent to step (c) but prior to step (d) there are performed the additional steps of printing a decorative pattern on to the surface of the essentially non-foaming resinous layer and of applying an overall transparent wear layer to the assembly.

6. A process as claimed in claim 1 wherein the said foamable resinous compositions comprise polyvinyl chloride plastisols containing a blowing agent.

7. A process as claimed in claim 6 wherein the said plastisols contain, per 100 parts by weight of polyvinyl chloride, from 3 to 100 parts by weight of a plasticiser; up to 10 parts by weight of the stabiliser; up to 10 parts by weight of blowing agent; up to 100 parts by weight of a filler; up to 10 parts by weight of a viscosity modifier; and up to 20 parts by weight of volatile additives.

8. A process as claimed in claim 1 wherein a thickness of at least 0.005 inches of foamable composition is applied in step (a).

9. A process as claimed in claim 1 wherein a thickness of from 0.002 to 0.005 inches of foamable composition is applied in step (b).

10. A process as claimed in claim 1 wherein the essentially non-foamable resinous composition comprises a polyvinyl chloride plastisol.

11. A process as claimed in claim 10 wherein the essentially non-foamable resinous composition is as defined in claim 7 with the omission of a blowing agent.

12. A process as claimed in claim 1 wherein the thickness of the essentially non-foaming resinous composition measured at points where the second foamable resinous composition has been applied is at least 0.0005 inches.

13. A surface covering material having a textured effect which comprises a substrate of backing layer, a layer of a first foamed resinous composition on the substrate or backing layer, a second foamed resinous composition on selected areas of the said first foamed resinous composition and a layer of an essentially non-foamed resinous composition over the said first and second foamed resinous compositions; the surface of the said material being at a higher level in areas with both first and second foamed resinous composition applied than in other areas of the surface covering material; and the said second foamed resinous composition having a structure characteristic of a resinous composition which has foamed to a significant extent whilst supported by a non-foaming substrate.

14. A surface covering material as claimed in claim 13 wherein the layer of essentially non-foamed resinous composition is a transparent wear layer with a decorative pattern applied between the first and second foamed resinous compositions and the said wear layer.

15. A surface covering material as claimed in claim 13 wherein the layer of essentially non-foamed resinous composition is opaque and a separate transparent wear layer is present with a decorative pattern applied between the said layer of essentially non-foamed resinous composition and the said wear layer.

* * * * *